United States Patent
Jusuf (10) Patent No.: US 11,510,763 B2
(45) Date of Patent: Nov. 29, 2022

(54) METHOD OF ESTABLISHING UPPER BOUNDARY FOR DENTAL PROSTHETIC

(71) Applicant: NATIONAL DENTEX, LLC, Palm Beach Gardens, FL (US)

(72) Inventor: Armand C. Jusuf, Reno, NV (US)

(73) Assignee: NATIONAL DENTEX, LLC, Jupiter, FL (US)

(*) Notice: Subject to any disclaimer, the term of this patent is extended or adjusted under 35 U.S.C. 154(b) by 701 days.

(21) Appl. No.: 16/508,813

(22) Filed: Jul. 11, 2019

(65) Prior Publication Data

US 2020/0022791 A1 Jan. 23, 2020

Related U.S. Application Data

(60) Provisional application No. 62/701,083, filed on Jul. 20, 2018.

(51) Int. Cl.
*A61C 13/225* (2006.01)
*A61C 9/00* (2006.01)
*A61C 13/34* (2006.01)
*A61C 19/05* (2006.01)

(52) U.S. Cl.
CPC ............ *A61C 13/225* (2013.01); *A61C 9/004* (2013.01); *A61C 13/34* (2013.01); *A61C 19/052* (2013.01)

(58) Field of Classification Search
CPC ..... A61C 13/00; A61C 13/0001; A61C 13/34; A61C 5/20; A61C 19/04; A61C 19/052
See application file for complete search history.

(56) References Cited

U.S. PATENT DOCUMENTS

| | | | | |
|---|---|---|---|---|
| 4,259,074 A | * | 3/1981 | Link | A61C 13/00 433/214 |
| 5,639,235 A | * | 6/1997 | Lapointe | A61C 13/082 433/229 |
| 8,899,984 B2 | | 12/2014 | Llop et al. | |
| 9,504,533 B2 | | 11/2016 | Groscurth et al. | |
| 9,693,834 B2 | | 7/2017 | Llop | |
| 9,795,458 B2 | | 10/2017 | Llop | |
| 2011/0033815 A1 | * | 2/2011 | Stonisch | A61C 13/0001 433/24 |
| 2014/0272778 A1 | | 9/2014 | Llop | |
| 2015/0010881 A1 | | 1/2015 | Llop | |
| 2016/0008108 A1 | * | 1/2016 | Thompson | A61C 13/10 433/213 |
| 2016/0038255 A1 | | 2/2016 | Llop | |
| 2017/0112591 A1 | | 4/2017 | Llop | |
| 2017/0112592 A1 | | 4/2017 | Groscurth et al. | |
| 2017/0196657 A1 | * | 7/2017 | Nixon | A61C 13/206 |
| 2017/0252126 A1 | | 9/2017 | Llop | |

* cited by examiner

*Primary Examiner* — Cris L. Rodriguez
*Assistant Examiner* — Sydney J Pulvidente
(74) *Attorney, Agent, or Firm* — Frost Brown Todd LLC (57) ABSTRACT

A method is used to provide a dental prosthetic with an upper boundary that cannot be seen when a patient smiles with the dental prosthetic installed. The method includes tracing a smile line on a dental appliance while the dental appliance is in the patient's mouth and while the patient is smiling. The method then includes transferring that smile line from the dental appliance to a study cast of the patient's mouth. The study cast is then scanned to create a three-dimensional digital model that includes the transferred smile line. The three-dimensional digital model is used to generate a surgical plan and surgical hardware for installation of the dental prosthetic. The dental prosthetic may include a full arch restoration.

20 Claims, 5 Drawing Sheets

METHOD OF ESTABLISHING UPPER BOUNDARY FOR DENTAL PROSTHETIC

PRIORITY

This application claims priority to U.S. Provisional Pat. App. No. 62/701,083, entitled "Method of Establishing Upper Boundary for Dental Prosthetic," filed Jul. 20, 2018, the disclosure of which is incorporated by reference herein.

BACKGROUND

Some patients may develop tooth loss warranting prosthetic replacement. Some instances may warrant a full dental arch restoration. To properly seat a permanent dental prosthetic, it may be necessary to remodel dental bone structures, thereby providing a substantially flat foundation for the prosthetic. After providing a substantially flat foundation, the dental surgeon may drill passageways into the bone in which to secure implants. Once these passageways are formed and the implants are secured therein, the surgeon may secure abutments to the implants. After the abutments are secured to the implants, the surgeon may secure the prosthetic to the abutments, thereby permanently affixing the prosthetic to the patient's bone via the abutments and implants.

Various forms of hardware may be used to perform the above-described surgical procedure. Examples of such hardware and associated procedures are described in U.S. Pat. No. 8,899,984, entitled "CT-Based, Side-Loading Surgical and Laboratory Dental Implant Guide System and Method," issued Dec. 2, 2014, the disclosure of which is incorporated by reference herein; U.S. Pat. No. 9,504,533, entitled "Endentulous Surgical Guide," issued Nov. 29, 2016, the disclosure of which is incorporated by reference herein; U.S. Pat. No. 9,693,834, entitled "Implant-Based Attachment System for Dental Implant Surgical Guide and Method," issued Jul. 4, 2017, the disclosure of which is incorporated by reference herein; U.S. Pat. No. 9,795,458, entitled "Dental Surgical Implant Guide and Prosthesis Combination and Method of Use," issued Oct. 24, 2017, the disclosure of which is incorporated by reference herein; U.S. Pub. No. 2014/0272778, entitled "Bone Foundation Guide and Method of Use," published Sep. 18, 2014, the disclosure of which is incorporated by reference herein; U.S. Pub. No. 2015/0010881, entitled "Bone Foundation Guide and Method of Use," published Jan. 8, 2015, the disclosure of which is incorporated by reference herein; U.S. Pub. No. 2016/0038255, entitled "Bone Foundation Guide System and Method," published Feb. 11, 2016, the disclosure of which is incorporated by reference herein; U.S. Pub. No. 2017/0112591, entitled "Bone Foundation Guide System and Method," published Apr. 27, 2017, the disclosure of which is incorporated by reference herein; U.S. Pub. No. 2017/0112592, entitled "Method of Using an Endentulous Surgical Guide," published Apr. 27, 2017, the disclosure of which is incorporated by reference herein; and U.S. Pub. No. 2017/0252126, entitled "Bone Foundation Guide System and Method," published Sep. 7, 2017, the disclosure of which is incorporated by reference herein.

While several dental surgical systems and methods have been made and used, it is believed that no one prior to the inventors has made or used the invention described in the appended claims.

BRIEF DESCRIPTION OF THE DRAWINGS

The drawings and detailed description that follow are intended to be merely illustrative and are not intended to limit the scope of the invention as contemplated by the inventors.

DETAILED DESCRIPTION

The following description of certain examples of the invention should not be used to limit the scope of the present invention. The drawings, which are not necessarily to scale, depict selected embodiments and are not intended to limit the scope of the invention. The detailed description illustrates by way of example, not by way of limitation, the principles of the invention. Other examples, features, aspects, embodiments, and advantages of the invention will become apparent to those skilled in the art from the following description, which is by way of illustration, one of the best modes contemplated for carrying out the invention. As will be realized, the invention is capable of other different or equivalent aspects, all without departing from the invention. Accordingly, the drawings and descriptions should be regarded as illustrative in nature and not restrictive.

Any one or more of the teachings, expressions, versions, examples, etc. described herein may be combined with any one or more of the other teachings, expressions, versions, examples, etc. that are described herein. The following-described teachings, expressions, versions, examples, etc. should therefore not be viewed in isolation relative to each other. Various suitable ways in which the teachings herein may be combined will be readily apparent to those skilled in the art in view of the teachings herein. Such modifications and variations are intended to be included within the scope of the claims.

As used herein, the terms "about" or "approximately" for any numerical values or ranges indicate a suitable dimensional tolerance that allows the part or collection of components to function for its intended purpose as described herein. More specifically, "about" or "approximately" may refer to the range of values ±10% of the recited value, e.g. "about 90%" may refer to the range of values from 81% to 99%. In addition, as used herein, the terms "patient," "host,"

"user," and "subject" refer to any human or animal subject and are not intended to limit the systems or methods to human use, although use of the subject invention in a human patient represents a preferred embodiment.

I. Exemplary Method of Establishing Prosthetic Boundary

Figure 1:
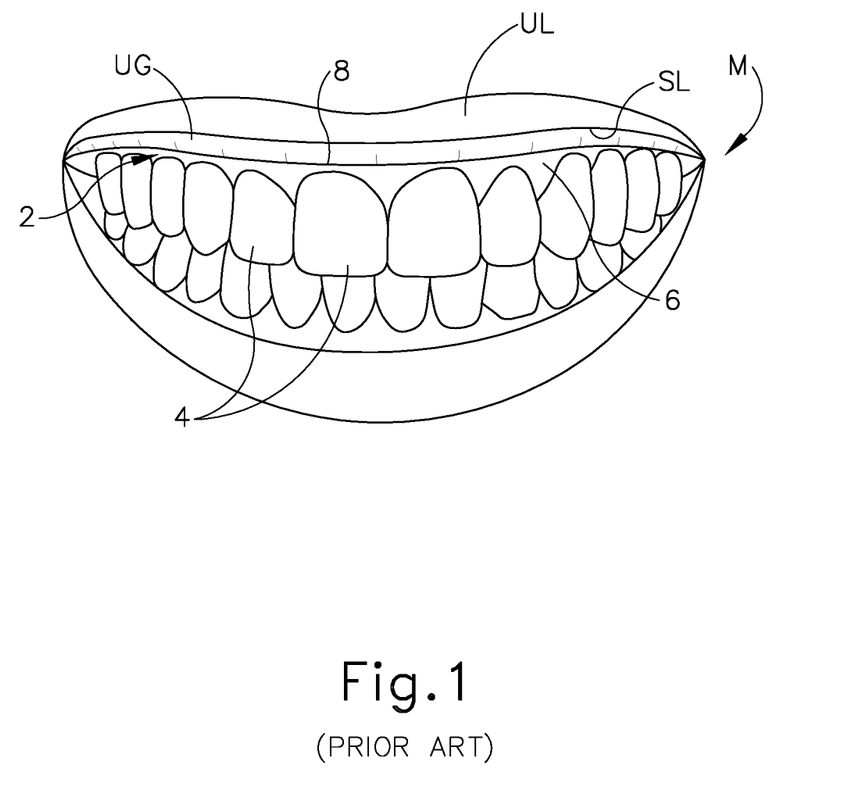
FIG. 1 depicts a front elevational view of a patient's mouth with an exemplary dental prosthetic installed therein.

FIG. 1 shows an example of a patient's mouth (M) with a conventional dental prosthetic (2) installed therein. In this example, the dental prosthetic (2) includes a complete replacement of all the teeth of the patient's maxillary alveolar arch and includes a full set of prosthetic maxillary or upper teeth (4) and a prosthetic gum portion (6). In this example, the patient has smile where the upper lip (UL) is positioned higher than the upper edge (8) of the gum portion (6) of the dental prosthetic (2). Thus, a portion of the patient's upper gum (UG) and the upper edge (8) of the gum portion (6) of the dental prosthetic (2) are exposed when the patient smiles. In this example, the upper edge (8) of the gum portion (6) of the dental prosthetic (2) is substantially flat; and the region of the upper gum (UG) adjacent to the upper edge (8) is recessed posteriorly relative to the upper edge (8). This structural configuration and relationship provides visual emphasis of the presence of the dental prosthetic (2) when the patient smiles. This visual effect may be undesirable.

It may therefore be desirable to provide a version of the dental prosthetic (2) in which the upper edge (8) of the gum portion (6) of the dental prosthetic (2) is not visible when the patient smiles. In other words, it may be desirable to provide a version of the dental prosthetic (2) in which the upper edge (8) is obscured behind the patient's upper lip (UL). This may be relatively difficult using conventional techniques, particularly since the lower boundary of a patient's upper lip (UL) (hereinafter referred to as a "smile line" (SL)) may vary substantially from patient to patient, as some patients may have a relatively high smile line (SL) while other patients may have a relatively low smile line (SL). In scenarios where the dental prosthetic (2) is designed digitally using three-dimensional modeling software, the prosthetic designer may look at two-dimensional photographs of the patient smiling, to thereby try to establish the approximate location of the patient's smile line (SL) and effectively transpose the smile line (SL) into the three-dimensional digital model. Another technique may include digitally overlaying a two-dimensional photograph of a patient smiling onto a three-dimensional model of the patient's dentition (e.g., from a three-dimensional scan of a study cast of the patient's dentition), and then trying to effectively trace the smile line (SL) from the two-dimensional photograph onto the three-dimensional model. To the extent that either technique is effective in some scenarios, it may be ineffective in other scenarios since it requires substantial skill of the designer; and since it involves transposition of visual data from a two-dimensional photograph to a three-dimensional digital model. These techniques may also have particularly unpredictable results in when the patient at hand has a relatively high smile line (SL).

In view of the foregoing, it may be desirable to provide a method of accurately establishing a patient's smile line (SL) in three-dimensional models associated with dental prosthetics, with results that are satisfactory on a consistent basis from patient to patient. An example of such a method is described in greater detail below. While the foregoing example is described in the context of a smile line (SL) associated with the maxillary alveolar ridge and an associated dental prosthetic (2), the teachings herein may also be applied in the context of a smile line (SL) associated with the mandibular alveolar ridge and an associated dental prosthetic (2).

Figure 2:
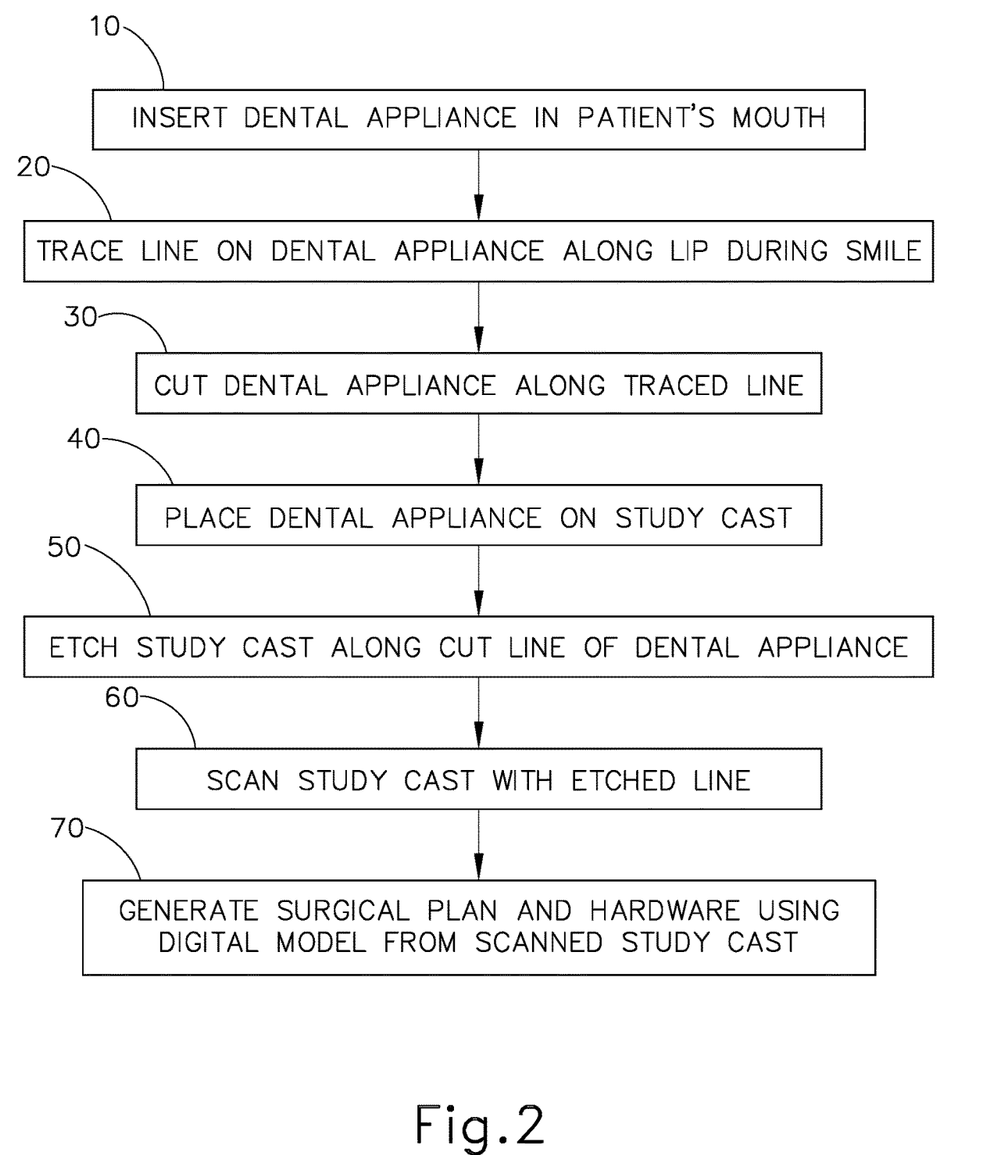
FIG. 2 depicts a flow chart showing an exemplary method of making a dental prosthetic.
Figure 3:
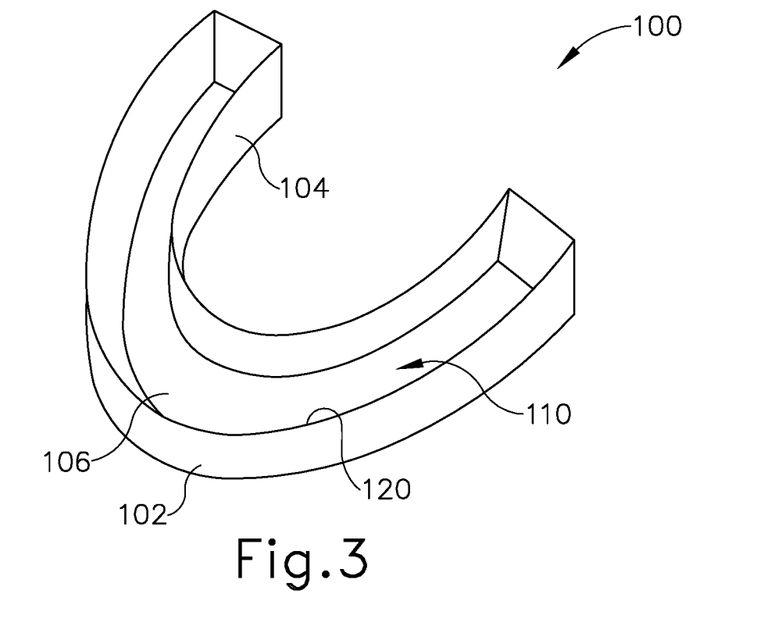
FIG. 3 depicts a perspective view of an exemplary dental appliance that may be used during performance of the method of FIG. 2.

FIG. 2 shows an exemplary method of establishing a dental prosthetic (2) and associated hardware where the upper edge (8) of the prosthetic (2) will be positioned above the smile line (SL) of the patient on a reliable basis. As a first step (block 10) of this method, a dental appliance (100) is inserted into the patient's mouth (M). FIG. 3 shows an exemplary dental appliance (100). As shown, dental appliance (100) somewhat resembles a mouth guard and includes an anterior surface (106), a posterior surface (104), and a trench (110) with a floor (106). Anterior surface (106) includes an upper edge (120). By way of example only, dental appliance (100) may comprise rubber, silicone, plastic or any other suitable material. It may also be desirable to minimize the thickness of the material forming dental appliance (100), to thereby avoid or otherwise minimize any repositioning of the patient's upper lip (UL) due to the presence of dental appliance (100) in the patient's mouth (M).

Figure 4:
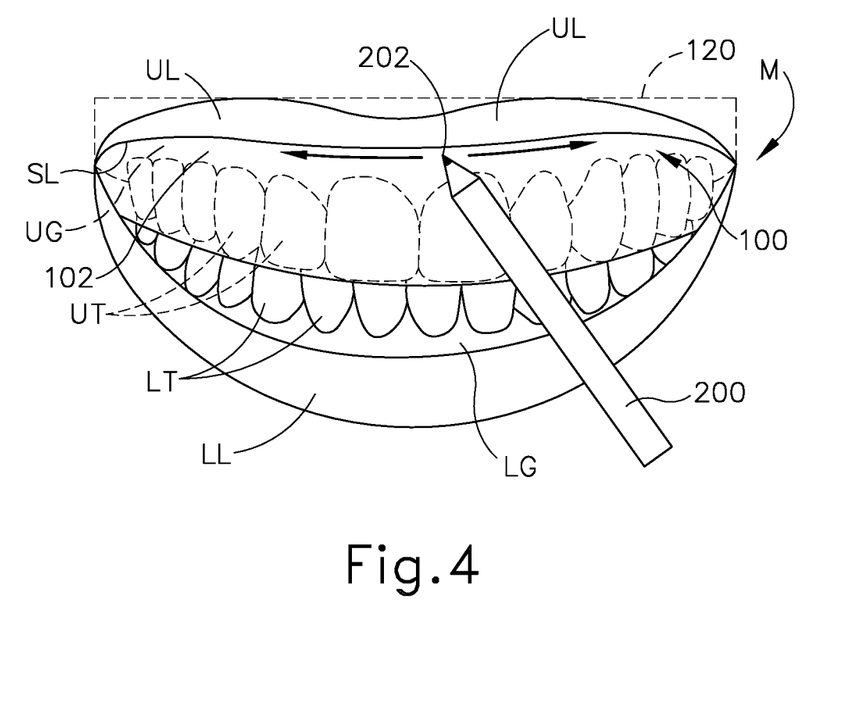
FIG. 4 depicts a front elevational view of the dental appliance of FIG. 3 installed in a patient's mouth, with a boundary line being traced on the dental appliance, during performance of the method of FIG. 2.

FIG. 4 shows dental appliance (100) inserted into the patient's mouth (M) while the patient is smiling. As shown, the patient's maxillary or upper teeth (UT) are positioned in trench (110) of dental appliance (100), while a portion of anterior surface (102) is exposed. Anterior surface (102) covers the patient's maxillary or upper gum (UG) in this example. The patient's mandibular or lower teeth (LT), lower gum (LG), and lower lip (LL) are also exposed. In some versions, dental appliance (100) is vacuum formed to the patient's upper teeth (UT) and upper gum (UG). While the example described herein is in the context of dental appliance (100) being positioned on the patient's upper teeth (UT) and upper gum (UG) to gauge a smile line (SL) from the upper lip (UL), other variations may provide dental appliance (100) on the lower teeth (LT) and lower gum (LG) to gauge a smile line (SL) from the lower lip (LL).

Figure 5:
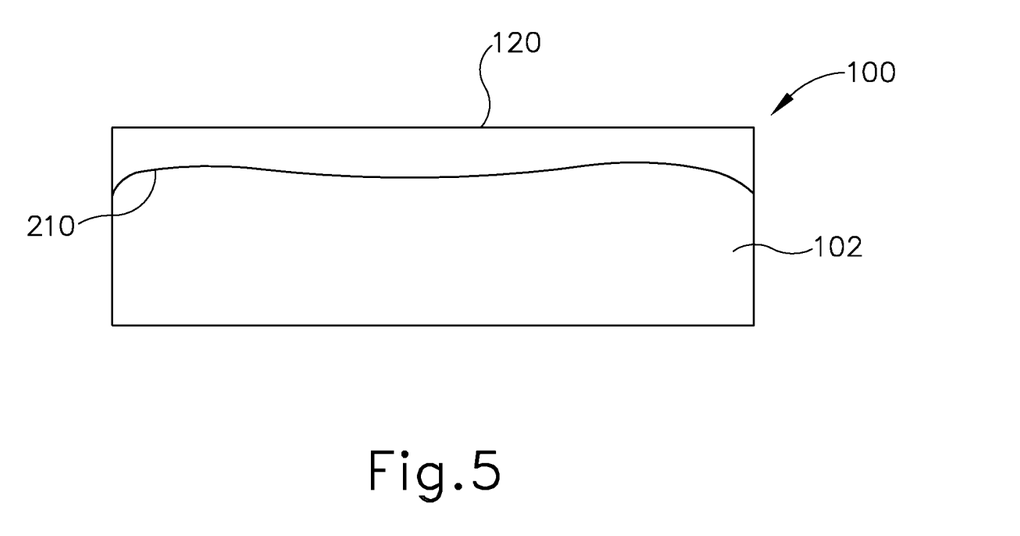
FIG. 5 depicts a front elevational view of the dental appliance of FIG. 3, with the boundary line of FIG. 4 traced thereon, after removal from the patient's mouth in accordance with the method of FIG. 2.

Returning to FIG. 2, as a next step (block 20), the dental practitioner (e.g., dentist, oral surgeon, assistant, lab technician, etc.) traces a line on anterior surface (102) along the smile line (SL) defined by the upper lip (UL). The dental practitioner may instruct the patient to produce the largest smile possible at this stage, to place the smile line (SL) as high as possible. FIG. 4 shows a marking instrument (200) being used to trace the smile line (SL) on anterior surface (102). Marking instrument (200) includes a marking tip (202). By way of example only, marking instrument (200) may include a conventional marker or pen. Various suitable forms that marking instrument (200) may take will be apparent to those skilled in the art in view of the teachings herein. FIG. 5 shows dental appliance (100) after dental appliance (100) has been removed from the mouth (M) of the patient following the step (block 20) of tracing the smile line (SL) on anterior surface (102). The smile line (SL) has thus been transferred onto anterior surface (102) as a traced line (210).

Figure 6:
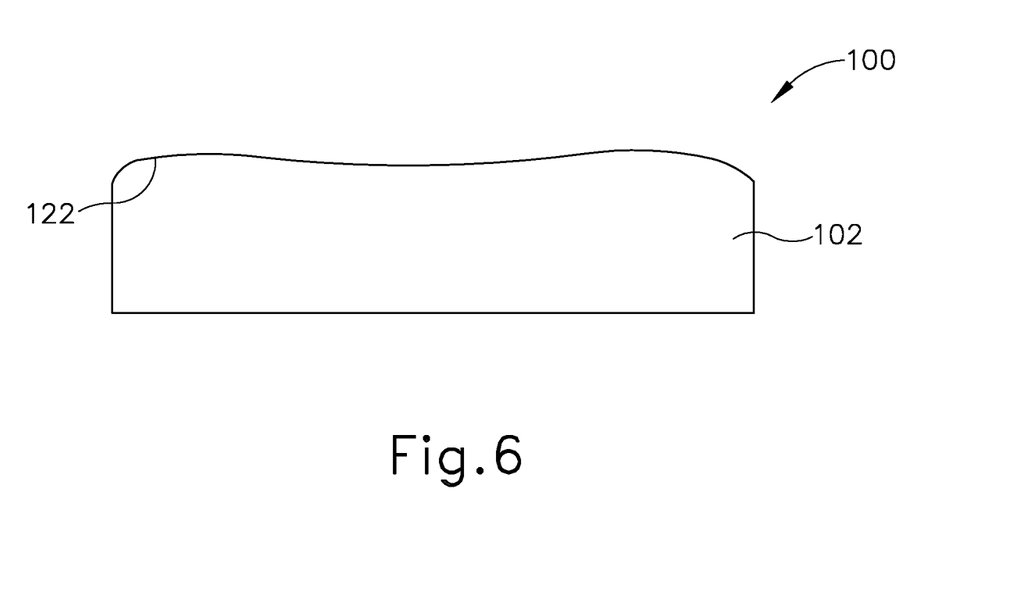
FIG. 6 depicts a front elevational view of the dental appliance of FIG. 3 after being cut along the boundary line of FIG. 5 in accordance with the method of FIG. 2.

As further shown in FIG. 2, as a next step (block 30), the dental practitioner cuts dental appliance (100) along traced line (210). FIG. 6 shows dental appliance (100) after dental appliance (100) has been cut along traced line (210). This modified version of dental appliance (100) now has a customized upper edge (122) resulting from the cut formed along traced line (210). This customized upper edge (122) corresponds with the position of the patient's smile line (SL). Thus, the particular location and configuration of customized upper edge (122) will vary from patient to patient. Various suitable instruments that may be used to cut dental appliance (100) along traced line (210) will be apparent to those skilled in the art in view of the teachings herein.

Figure 7:
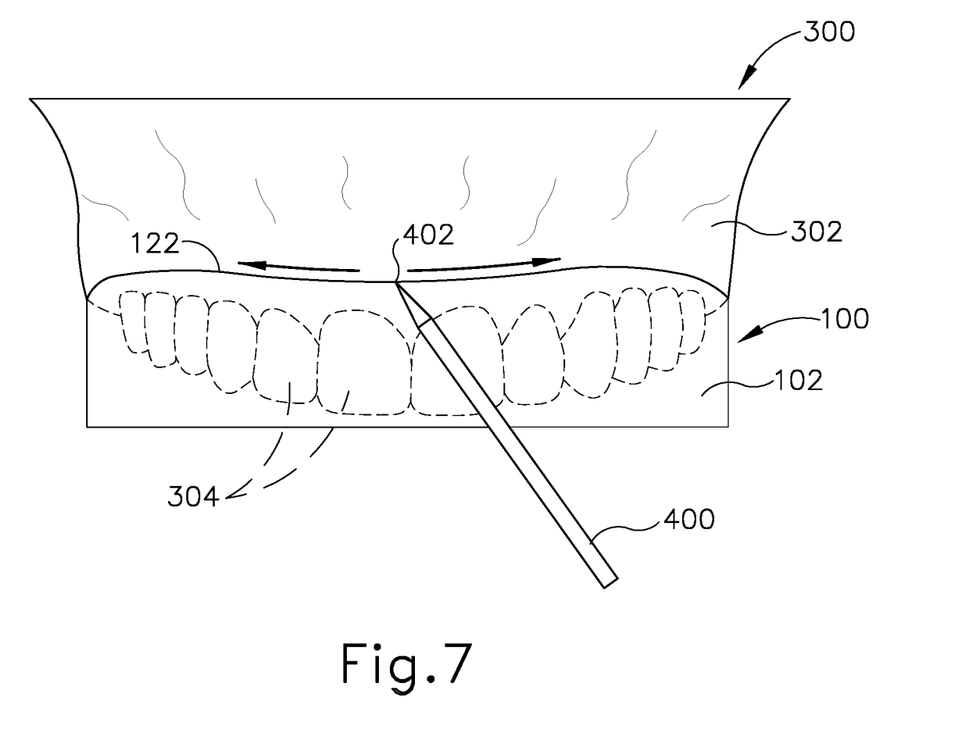
FIG. 7 depicts a front elevational view of the cut dental appliance of FIG. 6 installed on a study cast of the mouth FIG. 4, with the cut line being etched into the study cast, in accordance with the method of FIG. 2.

After cutting dental appliance (100) along traced line (210) to form of customized upper edge (122), the next step (block 40) as shown in FIG. 2 includes placing dental appliance (100) on a study cast of the patient's maxillary alveolar ridge. FIG. 7 shows this placement. As shown, study cast (300) includes a cast of the patient's teeth (304) as well as the adjacent bone and gum structure (302). With the cast of the patient's teeth (304) fully seated in trench (110), customized upper edge (122) is positioned on the cast of the bone and gum structure (302) at the same position in which the patient's actual smile line (SL) is located along the upper gum (UG).

With the cast of the patient's teeth (304) fully seated in trench (110) of dental appliance (100), the next step (block 50) as shown in FIG. 2 includes etching study cast (300) along the customized upper edge (122) of dental appliance (100). This is also shown in FIG. 7, in which an etching instrument (400) is used to score or etch into study cast (300) along customized upper edge (122) of dental appliance (100). Etching instrument (400) has a sharp tip (402) that may be pressed into study cast (300) as tip (402) is moved laterally along customized upper edge (122). Various suitable forms that etching instrument (400) may take will be apparent to those skilled in the art in view of the teachings herein.

Figure 8:
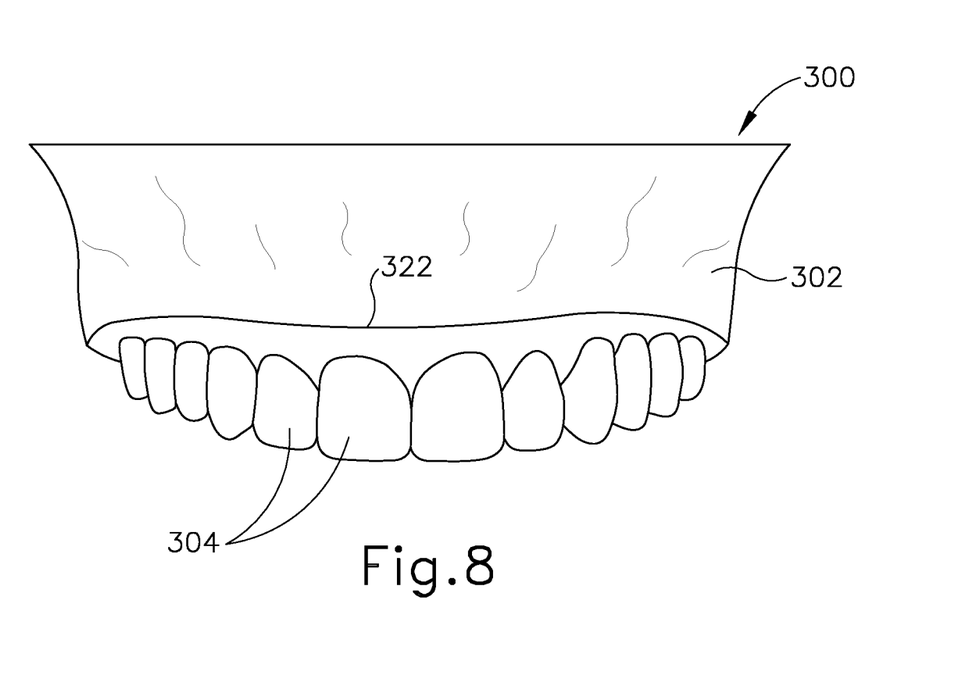
FIG. 8 depicts a front elevational view of the study cast of FIG. 7 with the etched line of FIG. 7.

By way of example only, study cast (300) may be formed of plaster, plastic, or some other material that will enable sharp tip (402) to remove some material from study cast (300) during the etching step (block 50) without compromising the structural integrity of study cast (300). FIG. 8 shows study cast (300) after the etching step (block 50) is complete and dental appliance (100) is removed. As shown, the etching step (block 50) has left an etched line (322) in study cast (300). Etched line (322) is at the same location as customized upper edge (122) of dental appliance (100), which is also at the same location as the patient's smile line (SL). Dental appliance (100) has thus been used to effectively transpose the patient's smile line (SL) from the patient's actual mouth (M) to the study cast (300) of the maxillary alveolar ridge of the patient's mouth (M).

In some variations, the step (block 30) of cutting dental appliance (100) along traced line (210) is omitted, and the dental practitioner instead drives sharp tip (402) of etching instrument (400) directly through dental appliance (100) to engage study cast (300); then moves etching instrument (400) along traced line (210), thereby cutting dental appliance (100) and etching line (322) in study cast (300) simultaneously. In such versions, etching instrument (400) may include a transversely presented sharp blade just proximal to sharp tip (402) to facilitate cutting of dental appliance (100) along traced line (210) during the etching step (block 50).

As a next step (block 60), as shown in FIG. 2, study cast (300) is scanned with etched line (322) formed therein. This scanning may include using any suitable conventional three-dimensional scanning device and associated software to thereby convert study cast (300) into a three-dimensional digital model. Suitable scanning devices and associated conversion software will be apparent to those skilled in the art in view of the teachings herein. Since etched line (322) is a physical structural feature of study cast (300) (i.e., a recess formed in the surface of study cast (300)), etched line (322) will be present in the three-dimensional digital model of study cast (300).

The next step (block 70) includes generating a surgical plan and hardware using the three-dimensional digital model of study cast (300) that was generated during the step (block 60) described immediately above. The hardware generated during this step (block 70) may include a bone reduction guide or bone foundation guide that is used to guide a bur or other bone reducing instrument during a process of reducing the bone on the patient's maxillary alveolar ridge before installing the dental prosthesis (2). The hardware generated during this step (block 70) may also include a surgical guide that is used to guide a drill that is used to drill bores into the patient's maxillary alveolar ridge after performing the bone reduction. The surgical guide may also be used to guide implants into the drilled bores; and to further guide installation of abutments onto implants. The hardware generated during this step (block 70) may also include the final prosthesis (2) itself.

As part of the process of generating the hardware during performance of the foregoing step (block 70), a designer may generate three-dimensional digital models of the hardware based on the three-dimensional digital model of study cast (300). The actual hardware may be produced using rapid prototyping equipment, such as a three-dimensional printer or other additive manufacturing device, based on the three-dimensional digital models of the hardware. Various suitable devices and techniques that may be used to convert the three-dimensional digital models of the hardware into physical manifestations of the hardware that can be used to carry out the surgical plan of installing prosthesis (2) will be apparent to those skilled in the art in view of the teachings herein.

By way of example only, the hardware generated through the foregoing step (block 70) may be configured and used in accordance with at least some of the teachings of U.S. Pat. No. 8,899,984, the disclosure of which is incorporated by reference herein; U.S. Pat. No. 9,504,533, the disclosure of which is incorporated by reference herein; U.S. Pat. No. 9,693,834, the disclosure of which is incorporated by reference herein; U.S. Pat. No. 9,795,458, the disclosure of which is incorporated by reference herein; U.S. Pub. No. 2014/0272778, the disclosure of which is incorporated by reference herein; U.S. Pub. No. 2015/0010881, the disclosure of which is incorporated by reference herein; U.S. Pub. No. 2016/0038255, the disclosure of which is incorporated by reference herein; U.S. Pub. No. 2017/0112591, the disclosure of which is incorporated by reference herein; U.S. Pub. No. 2017/0112592, the disclosure of which is incorporated by reference herein; and/or U.S. Pub. No. 2017/0252126, the disclosure of which is incorporated by reference herein.

By having a bone reduction guide and plan that was designed by factoring in the position of the patient's smile line (SL) in an accurately transposed fashion, the bone reduction steps of the surgical procedure may ensure that the bone is reduced to a position that is higher than the patient's smile line (SL). In addition, by having a prosthetic (2) that was designed by factoring in the position of the patient's smile line (SL) in an accurately transposed fashion, the height of the prosthetic (2) will be such that the upper edge (8) of the gum portion (6) of the dental prosthetic (2) is positioned higher than the patient's smile line (SL). The upper edge (8) will therefore be obscured behind the patient's upper lip (UL) and will not be visible when the patient smiles after dental prosthetic (2) is installed in the patient's mouth (M).

In some scenarios, the method described herein is performed by different parties.

For instance, the steps (blocks 10, 20) of inserting dental appliance (100) in the patient's mouth (M) and tracing line (210) on anterior surface (102) may be performed by a dental practitioner such as a dentist or oral surgeon. The dental practitioner may then send dental appliance (100) to a dental lab. The remaining steps (blocks 30, 40, 50, 60, 70) may then be performed by a technician at the dental lab. Of course, the steps of the method described herein may be performed by any suitable number or types of parties; and in some cases may even be performed by just one party.

As another merely illustrative variation, the step (block 20) of tracing line (210) on anterior surface (102) may be performed using a marking instrument (200) that is capable of marking with ink that is radiopaque or that otherwise has properties making line (210) clearly visible in a three-dimensional digital scan (block 60). In such scenarios, the steps (blocks 30, 50) of cutting dental appliance (100) along traced line (210) and etching study cast (300) may be eliminated. Instead, dental appliance (100) may be placed on study cast (300) (block 40) after line (210) has been traced on anterior surface (102); and then the combination of study cast (300) and dental appliance (100) may be scanned (block 60) using any suitable conventional three-dimensional scanning device. Due to the radiopaque nature or other characteristics of the ink or other material deposited by marking instrument (200) on anterior surface (102) along line (210), line (210) may appear in the three-dimensional digital model of study cast (300), in a manner similar to etched line (322) described above. The patient's smile line (SL) may thus be effectively transferred to study cast (300) either via etched line (322) or via a scanned rendition of traced line (210).

II. Exemplary Combinations

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

EXAMPLE 1

A method comprising: (a) inserting a dental appliance into a patient's mouth such that the dental appliance covers a set of teeth in the patient's mouth, wherein the dental appliance includes an anterior surface; (b) tracing a line along the anterior surface while the patient smiles, wherein the line is traced along a boundary of one of the patient's lips; and (c) removing the dental appliance from the patient's mouth with the traced line on the dental appliance.

EXAMPLE 2

The method of Example 1, further comprising transferring the traced line from the dental appliance to a study cast of the set of teeth.

EXAMPLE 3

The method of Example 2, wherein the act of transferring the traced line from the dental appliance to the study cast comprises etching a line on the study cast along a region corresponding to the traced line.

EXAMPLE 4

The method of Example 3, wherein the act of transferring the traced line from the dental appliance to the study cast further comprises placing the dental appliance on the study cast.

EXAMPLE 5

The method of Example 4, further comprising cutting the dental appliance along the traced line, thereby forming a cut line along the traced line, before placing the dental appliance on the study cast.

EXAMPLE 6

The method of Example 5, wherein the act of etching a line comprises applying a sharp point to the study cast along the cut line of the dental appliance.

EXAMPLE 7

The method of any one or more of Examples 2 through 7, further comprising scanning the study cast with the transferred traced line to thereby create a three-dimensional digital model of the scanned study cast with the transferred traced line in the three-dimensional digital model.

EXAMPLE 8

The method of Example 7, further comprising generating a surgical plan based on the three-dimensional digital model.

EXAMPLE 9

The method of Example 8, wherein the surgical plan includes a reduction of bone along the alveolar ridge associated with the set of teeth.

EXAMPLE 10

The method of any one or more of Examples 8 through 9, wherein the surgical plan includes installation of a dental prosthetic replacing at least a portion of the set of teeth.

EXAMPLE 11

The method of any one or more of Examples 7 through 10, further comprising generating surgical hardware based on the three-dimensional model.

EXAMPLE 12

The method of Example 11, wherein the surgical hardware comprises a bone reduction guide configured to guide reduction of bone along the alveolar ridge associated with the set of teeth.

EXAMPLE 13

The method of any one or more of Examples 11 through 12, wherein the surgical hardware comprises a dental prosthetic replacing at least a portion of the set of teeth.

EXAMPLE 14

The method of any one or more of Examples 11 through 13, wherein the act of generating surgical hardware comprises using additive manufacturing equipment to generate the surgical hardware.

EXAMPLE 15

The method of any one or more of Examples 1 through 14, wherein the set of teeth comprises a set of upper teeth, wherein the one of the patient's lips comprises the patient's upper lip.

EXAMPLE 16

The method of any one or more of Examples 1 through 15, further comprising vacuforming the dental appliance to the set of teeth.

EXAMPLE 17

A method comprising: (a) inserting a dental appliance into a patient's mouth such that the dental appliance covers a set of upper teeth in the patient's mouth, wherein the dental appliance includes an anterior surface; (b) tracing a line along the anterior surface while the patient smiles, wherein the line is traced along a lower boundary of the patient's upper lip; (c) removing the dental appliance from the patient's mouth with the traced line on the dental appliance; (d) placing the dental appliance on a study cast of the set of upper teeth; (e) transferring the traced line from the dental appliance to the study cast; (f) scanning the study cast to create a three-dimensional digital model of the study cast including the traced line; and (g) generating one or both of a surgical plan or surgical hardware based on the three-dimensional digital model.

EXAMPLE 18

The method of Example 17, further comprising cutting the dental appliance along the traced line to form a cut line, wherein the act of transferring the traced line from the dental appliance to the study cast comprises etching the study cast along the cut line.

EXAMPLE 19

The method of Example 18, wherein the act of etching comprises scraping the study cast with a sharp point of an etching instrument.

EXAMPLE 20

A method comprising: (a) inserting a dental appliance into a patient's mouth such that the dental appliance covers a set of upper teeth in the patient's mouth, wherein the dental appliance includes an anterior surface; (b) tracing a line along the anterior surface while the patient smiles, wherein the line is traced along a lower boundary of the patient's upper lip; (c) removing the dental appliance from the patient's mouth with the traced line on the dental appliance; (d) placing the dental appliance on a study cast of the set of upper teeth; (e) transferring the traced line from the dental appliance to the study cast; (f) scanning the study cast to create a three-dimensional digital model of the study cast including the traced line; (g) generating a bone reduction guide based on the three-dimensional digital model, wherein the bone reduction guide is configured to guide a bone reduction procedure to reduce bone in the patient's mouth to a point above the lower boundary of the patient's upper lip; and (h) generating a dental prosthetic based on the three-dimensional digital model, wherein the dental prosthetic is configured to have an upper boundary that will be obscured by the patient's upper lip when the patient smiles with the dental prosthetic installed in the patient's mouth.

III. Miscellaneous

It should be understood that any of the examples described herein may include various other features in addition to or in lieu of those described above. By way of example only, any of the examples described herein may also include one or more of the various features disclosed in any of the various references that are incorporated by reference herein.

It should be understood that any one or more of the teachings, expressions, embodiments, examples, etc. described herein may be combined with any one or more of the other teachings, expressions, embodiments, examples, etc. that are described herein. The above-described teachings, expressions, embodiments, examples, etc. should therefore not be viewed in isolation relative to each other. Various suitable ways in which the teachings herein may be combined will be readily apparent to those skilled in the art in view of the teachings herein. Such modifications and variations are intended to be included within the scope of the claims.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Having shown and described various versions of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, versions, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

I claim:

1. A method comprising:
   (a) inserting a dental appliance into a patient's mouth such that the dental appliance covers a set of teeth in the patient's mouth, wherein the dental appliance includes an anterior surface;
   (b) tracing a line along the anterior surface while the patient smiles, wherein the line is traced along a boundary of one of the patient's lips; and
   (c) removing the dental appliance from the patient's mouth with the traced line on the dental appliance.

2. The method of claim 1, further comprising transferring the traced line from the dental appliance to a study cast of the set of teeth.

3. The method of claim 2, wherein the act of transferring the traced line from the dental appliance to the study cast comprises etching a line on the study cast along a region corresponding to the traced line.

4. The method of claim 3, wherein the act of transferring the traced line from the dental appliance to the study cast further comprises placing the dental appliance on the study cast.

5. The method of claim 4, further comprising cutting the dental appliance along the traced line, thereby forming a cut line along the traced line, before placing the dental appliance on the study cast.

6. The method of claim 5, wherein the act of etching a line comprises applying a sharp point to the study cast along the cut line of the dental appliance.

7. The method of claim 2, further comprising scanning the study cast with the transferred traced line to thereby create a three-dimensional digital model of the scanned study cast with the transferred traced line in the three-dimensional digital model.

8. The method of claim 7, further comprising generating a surgical plan based on the three-dimensional digital model.

9. The method of claim 8, wherein the surgical plan includes a reduction of bone along an alveolar ridge associated with the set of teeth.

10. The method of claim 8, wherein the surgical plan includes installation of a dental prosthetic replacing at least a portion of the set of teeth.

11. The method of claim 7, further comprising generating surgical hardware based on the three-dimensional model.

12. The method of claim 11, wherein the surgical hardware comprises a bone reduction guide configured to guide reduction of bone along an alveolar ridge associated with the set of teeth.

13. The method of claim 11, wherein the surgical hardware comprises a dental prosthetic replacing at least a portion of the set of teeth.

14. The method of claim 11, wherein the act of generating the surgical hardware comprises using additive manufacturing equipment to generate the surgical hardware.

15. The method of claim 1, wherein the set of teeth comprises a set of upper teeth, wherein the one of the patient's lips comprises the patient's upper lip.

16. The method of claim 1, further comprising vacuforming the dental appliance to the set of teeth.

17. A method comprising:
   (a) inserting a dental appliance into a patient's mouth such that the dental appliance covers a set of upper teeth in the patient's mouth, wherein the dental appliance includes an anterior surface;
   (b) tracing a line along the anterior surface while the patient smiles, wherein the line is traced along a lower boundary of an upper lip of the patient's mouth;
   (c) removing the dental appliance from the patient's mouth with the traced line on the dental appliance;
   (d) placing the dental appliance on a study cast of the set of upper teeth;
   (e) transferring the traced line from the dental appliance to the study cast;
   scanning the study cast to create a three-dimensional digital model of the study cast including the traced line; and
   (g) generating one or both of a surgical plan or surgical hardware based on the three-dimensional digital model.

18. The method of claim 17, further comprising cutting the dental appliance along the traced line to form a cut line, wherein the act of transferring the traced line from the dental appliance to the study cast comprises etching the study cast along the cut line.

19. The method of claim 18, wherein the act of the etching comprises scraping the study cast with a sharp point of an etching instrument.

20. A method comprising:
   (a) inserting a dental appliance into a patient's mouth such that the dental appliance covers a set of upper teeth in the patient's mouth, wherein the dental appliance includes an anterior surface;
   (b) tracing a line along the anterior surface while the patient smiles, wherein the line is traced along a lower boundary of an upper lip of the patient's mouth;
   (c) removing the dental appliance from the patient's mouth with the traced line on the dental appliance;
   (d) placing the dental appliance on a study cast of the set of upper teeth;
   (e) transferring the traced line from the dental appliance to the study cast;
   scanning the study cast to create a three-dimensional digital model of the study cast including the traced line;
   (g) generating a bone reduction guide based on the three-dimensional digital model, wherein the bone reduction guide is configured to guide a bone reduction procedure to reduce bone in the patient's mouth to a point above the lower boundary of the patient's upper lip; and
   (h) generating a dental prosthetic based on the three-dimensional digital model, wherein the dental prosthetic is configured to have an upper boundary that will be obscured by the patient's upper lip when the patient smiles with the dental prosthetic installed in the patient's mouth.

\* \* \* \* \*